Aug. 15, 1967  J. L. BAUMAN ETAL  3,335,680
PLANTER
Original Filed Sept. 26, 1962  2 Sheets-Sheet 1
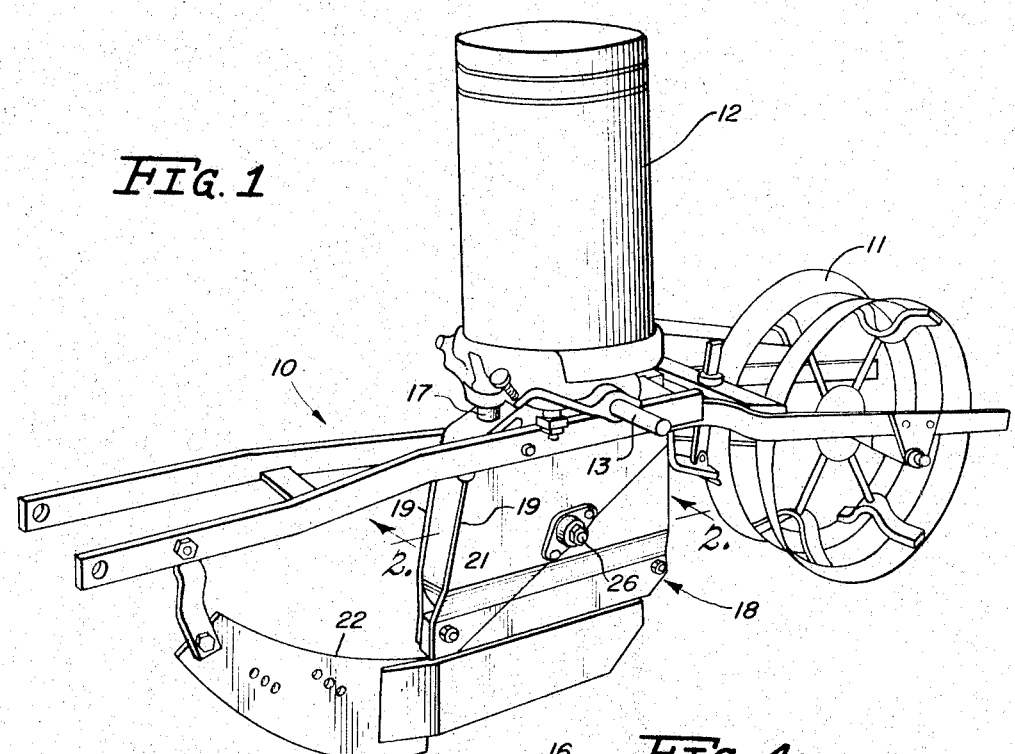
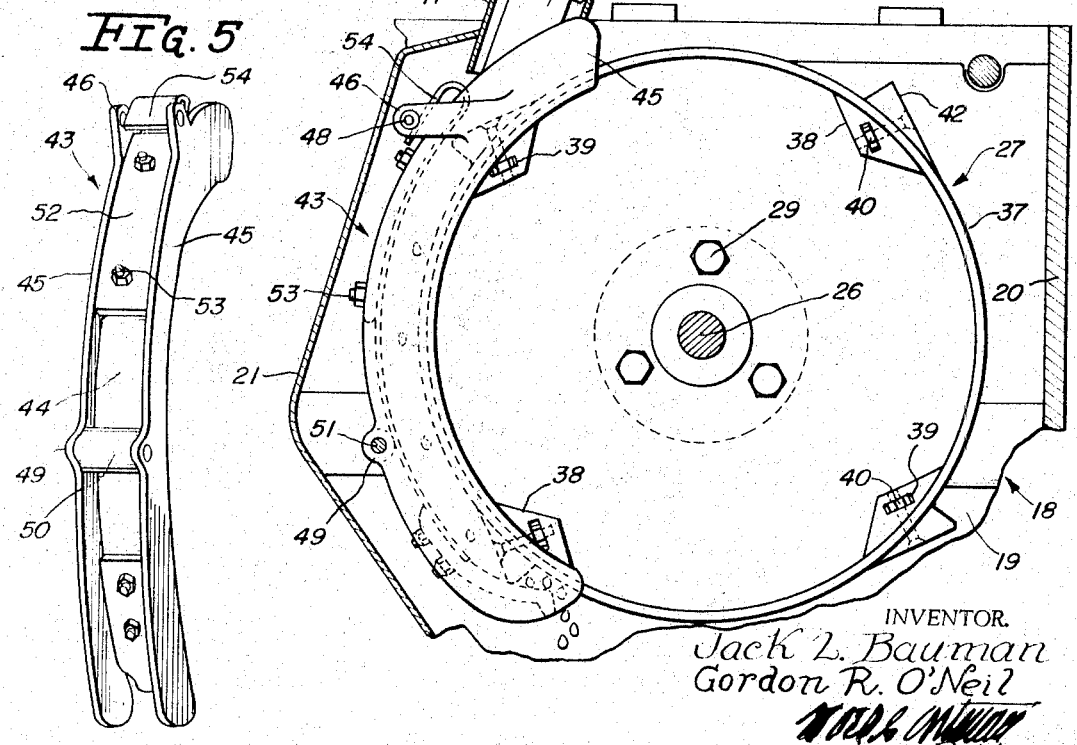
INVENTOR.
Jack L. Bauman
Gordon R. O'Neil
Atty.

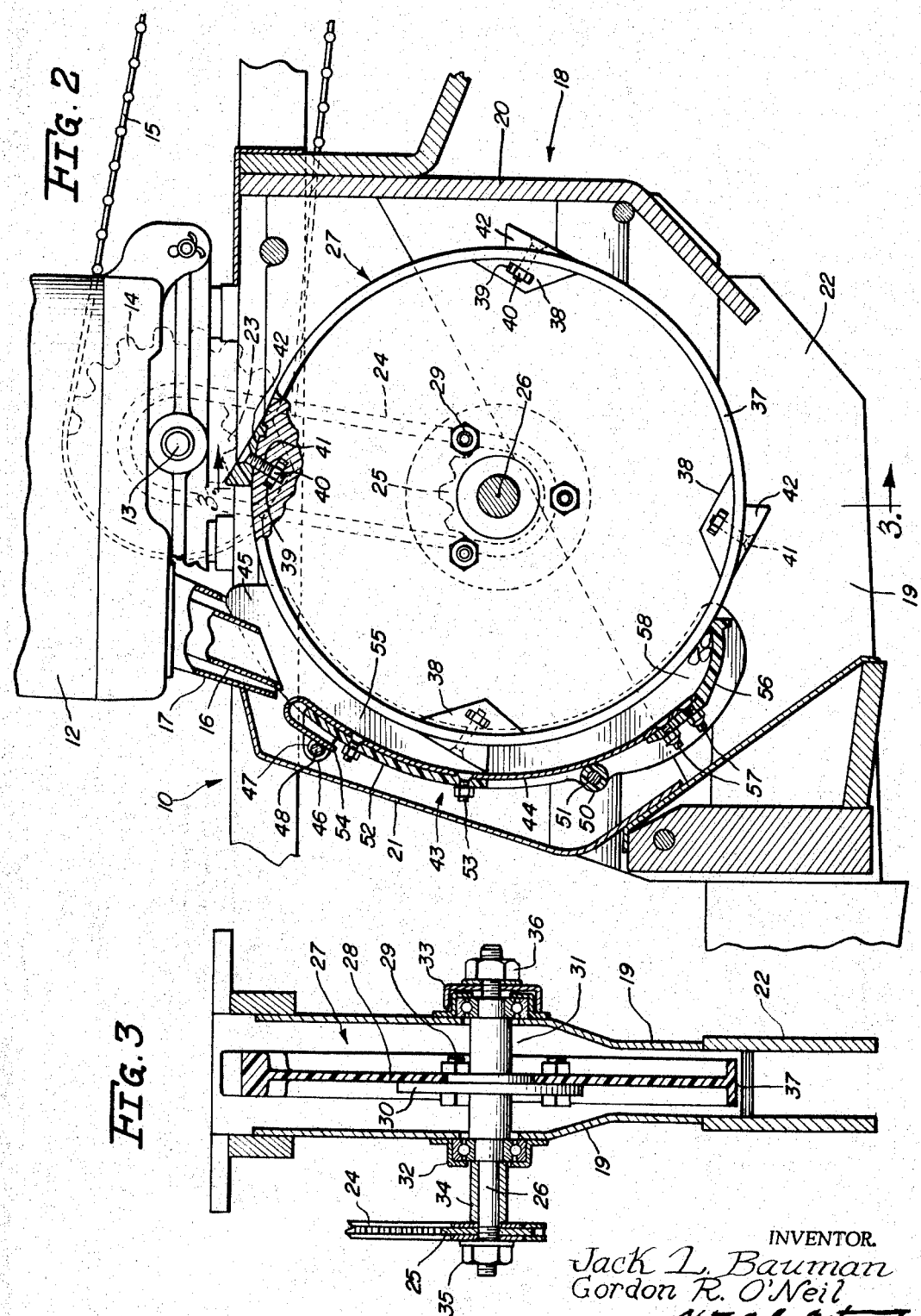

3,335,680
PLANTER

Jack L. Bauman, Naperville, and Gordon R. O'Neil, Westmont, Ill., assignors to International Harvester Company, a corporation of Delaware
Continuation of application Ser. No. 226,398, Sept. 26, 1962. This application May 11, 1964, Ser. No. 367,282
10 Claims. (Cl. 111—51)

ABSTRACT OF THE DISCLOSURE

Seed from a planter hopper is directed by gravity tangentially to a vertical rotary seed wheel having one or more lugs projecting from its periphery. The seed falling through a guide channel is arrested and accumulated by a spring retainer mounted in the channel extending inwardly of the lugs to the periphery of the wheel. During rotation of the wheel, one of the lugs engages the seed held between the retainer and the periphery of the wheel and deflects the retainer ejecting the seed.

---

This invention relates to planters and particularly hill drop planters, and is a continuation of U.S. application Ser. No. 226,398, filed Sept. 26, 1962, now abandoned.

An object of the invention is to provide improved seed-feeding mechanism for a planter to assure uniform spacing and the deposition of seed in the furrow with maximum precision and accuracy.

Another object of the invention is to provide in a hill drop planter, improved means for accumulating the seed in clusters and for discharging them into the furrow in compact grouping.

A further object of the invention is to provide improved guide means for receiving seed from a dispenser and directing it to the ground.

Other objects and advantages of the invention will become clear from the following detailed description when read in conjunction with the accompaying drawings wherein:

FIGURE 1 is a view in perspective of a ground driven planter unit incorporating the features of this invention;

FIGURE 2 is an enlarged section taken on the line 2—2 of FIGURE 1;

FIGURE 3 is a section taken on the line 3—3 of FIGURE 2;

FIGURE 4 is a sectional detail view similar to FIGURE 2 showing the relationship of the novel guide means to the hill drop wheel; and FIGURE 5 is a perspective view of the guide member of this invention.

The planter unit shown in FIGURE 1 comprises a frame 10 adapted for connection at its front end to a tractive vehicle and supported at its rear end by a ground-engaging press wheel 11. Seed dispensing mechanism of conventional construction is mounted on the frame and includes a hopper or container 12 from which seed is fed to a conventional seed plate, not shown, driven from a shaft 13 having mounted thereon a sprocket wheel 14 driven by a chain 15 from the ground wheel 11. Seed discharged from hopper 12 passes through a tube 16 contained in a spout 17 into a seed boot 18 comprising laterally spaced plates 19 having a rear connecting wall 20 and a forward connecting wall 21. To the lower end of boot 18 is secured a furrow opener 22 the forward end of which curves upwardly and is connected to the frame 10.

Chain 15 drives shaft 13, upon which is also mounted another sprocket wheel 23 connected by a drive chain 24 with sprocket wheel 25 secured to a shaft in the form of a bolt 26 to which is also affixed a wheel 27. Wheel 27 comprises a disk-shaped body portion 28 affixed by bolts 29 to a plate 30 secured to a sleeve 31 carried by bolt 26 mounted in bearings 32 and 33 anchored to the plates 19. A spacer 34 extends between bearing 32 and sprocket wheel 25 and the unit is held together by nuts 35 and 36 on the threaded ends of the bolts 32.

Disk portion 28 of the wheel 27 flares outwardly at its periphery to form the flattened rim 37 to the underside of which, as shown in FIGURES 2 and 4, are affixed a plurality of circumferentially spaced attaching structures 38. Each of the attaching structures or elements 38 is provided with a recess 39 in which is seated a nut 40 adapted to receive the threaded end of a screw 41 passed through registering openings provided in the attaching element 38 and a lug 42 mounted on the outer periphery of the wheel, and serving a purpose which will hereinafter become clear.

It will be noted from FIGURES 2 and 4 that a portion of wheel 27 is rotatable in the path of seed discharged through tube 16 and the diameter thereof is so chosen that it is driven from the ground wheel 11 at or near ground speed. Associated with the wheel adjacent the periphery thereof on an arc substantially described by the outer edges of the lugs 42 is a channel-shaped curved guide member 43 which includes an arcuately-shaped leaf spring 44, forming the base of the channel member 43 and spaced side wall members 45.

The side members 45 of the channel member 43 are provided near their upper ends with ears 46 having enlarged openings 47 adapted to receive a pin 48 mounted between the plates 19. Near the lower end of channel member 43 the side plates 45 are provided with ears 49 spaced by a sleeve 50 in which is pivotally received a pin 51 carried by plates 19 and about which the side plates are capable of pivoting within the limits of pin 48 in oversized opening 47.

The two sides 45 of channel member 43 are made of plastic and are connected near their upper ends by a base portion 52 to which spring 44 is anchored by bolts 53. The upper end of spring 44 is bent back upon itself to form a spring tongue 54 which engages pin 48 and holds it against one wall of the slot or opening 47, urging the channel member 43 radially inwardly toward wheel 27.

As will be particularly noted in FIGURES 2 and 4, channel member 43 flanks and overlaps the sides of rim 37 of the wheel in close association therewith to form with the periphery of the wheel a substantially closed conduit 55 which guides the seed from discharge tube 16 through the boot 18 and furrow opener 22 to the ground.

As will also be noted particularly well in FIGURE 2, the lower portion of spring 44 bears against sleeve 50 as a fulcrum to accommodate flexing of the lower end of the spring about said sleeve as a pivot. A cup-shaped pocket-forming member 56 made of plastic or the like is secured by bolts 57 to the lower end of the spring, the extension thereof being independent of the sides 45 and being curved forwardly between the side plates into substantial engagement with the periphery of wheel 27 to arrest the fall of seed through the guide channel and to accumulate the seed therein.

On the periphery of the wheel shown in the drawings four lugs 42 are provided and spaced 90° apart. During rotation of wheel 27 the lugs 42 successively engage seed accumulated in the cup 58 formed by the member 56 and deflect the latter radially outwardly against the inherent bias of spring 44 and about the sleeve 50 as a pivot axis to accommodate ejection of the accumulated seed to form a hill in the furrow containing a number of seed at linear space in the row between adjacent hills determined by the number of lugs 42. The lugs are easily removable, by removing bolts 41, to regulate the number of lugs on the wheel. For example, when only a single lug 42 is secured to one of the attaching elements 38 on the wheel, seed accumulated in pocket 58 is ejected only once for each revolution of the wheel, whereas with the four lugs shown in the drawings, member 56 is deflected and seed ejected four times for each revolution.

The diameter of the wheel shown in the drawings is a function of the spacing desired between hills of seed and the number of seed to be deposited per hill. The diameter of the wheel is approximately 12 inches and the circumference approximately 38 inches so that the spacing between hills in the row is approximately 10 inches represented by the distance between lugs 42. The removal of two lugs would provide ejection of seed twice for each revolution of the wheel and spacing between hills in the row of approximately 20 inches.

By use of the wheel shown in the drawings driven at ground speed, seed ejected from the pocket 58 falls naturally at the speed of travel to the ground so that it does not bounce when it hits the furrow and settles in a compact pattern, undisturbed, in the ground.

It is believed that the construction and operation of the novel planting apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In a hill drop planter, a frame, a seed container carried by the frame, a circular seed wheel rotatably mounted in the frame, means carried by the frame for rotating said wheel, at least one seed ejector lug affixed to the periphery of the wheel and projecting radially therefrom, an arcuate guide member yieldably mounted on the frame conforming to the curvature of the seed wheel and spaced therefrom the radial width of said lug to form a seed receiving channel therebetween and the periphery of the wheel wherein the seed is confined during rotation of the wheel, said guide member having its lower end extending radially inwardly of said lug toward the periphery of the wheel and into substantial engagement with said periphery of said wheel to form therewith a pocket for the accumulation of seed received in said channel, the seed in the channel being engageable with said lug and said lower end of the guide member being radially yieldable to accommodate ejection of the seed from said pocket upon engagement thereof with said lug.

2. In a planter having a mobile frame, a seed container mounted on the frame and a guide channel in the frame in association with the container to receive and guide seed therefrom to the ground, the combination of a wheel rotatably mounted on the frame having a portion of its periphery disposed in said channel, means carried by the frame for rotating said wheel, a lug affixed to the periphery of the wheel and extending across said channel to engage seed therein during rotation of the wheel and eject it from the lower end of the channel, and a pocket-forming member yieldably mounted on the channel radially outwardly of said lug and extending across the lower portion of said channel radially inwardly of said lug into cooperative relation with the periphery of said wheel to form therewith a pocket for the accumulation of seed, the seed in said pocket-forming member being engageable by said lug, and said pocket-forming member being yieldable radially of the wheel to accommodate ejection therefrom of the accumulated seed during rotation of the wheel.

3. The invention set forth in claim 2, wherein said pocket-forming member forms a portion of one wall of said guide channel and is spaced from the periphery of said wheel by the radial width of said lug, the lower end of said pocket member being bent radially inwardly toward the periphery of the wheel to form a pocket therewith.

4. The invention set forth in claim 3, wherein a plurality of said lugs are affixed to the periphery of said wheel at circumferentially spaced locations thereon and said pocket-forming member includes a leaf spring movably mounted on said frame having its lower end bent to conform to the shape of said pocket and deflectible by successive of said lugs during rotation of the wheel, whereby said lugs will periodically eject from said 5. The invention set forth in claim 4, wherein the upper end of said leaf spring is pivotally mounted on the frame and a stop carried by the channel is engageable with the lower portion of the spring to hold the bent lower end thereof in cooperative relation with the periphery of the wheel.

6. In a planter having a mobile frame and a seed container mounted on the frame, a boot structure carried by the frame through which seed passes from the container to the ground including spaced plates, a generally vertically disposed channel-shaped guide member mounted on the frame between said plates with its upper end in seed-receiving relation to the container, spaced-apart side walls and a base portion, a wheel rotatably mounted between said plates with a portion of its periphery received between said side walls to form a closure for said guide member, means carried by the frame for rotating said wheel, a plurality of seed-engaging members carried by the wheel, and means for removably securing said members to said wheel at circumferentially spaced locations to projecting radially from the periphery of the wheel and span the space therebetween and said base portion pocket the seeds accumulated therein.

in the path of the seed received from the container, whereby to engage the seed during rotation of the wheel and eject it from the lower end of the guide member, said seed engaging members being removable to vary the number thereof and therefore the circumferential spacing therebetween.

7. The invention set forth in claim 6, wherein the lower end of said base portion is curved radially inwardly toward the periphery of said wheel to form therewith a seed accumulating pocket and is deflectible outwardly independently of said side walls upon engagement thereof with said seed-engaging members to accommodate ejection of the seed to the ground.

8. In a planter having a mobile frame, a seed container and a boot structure mounted on the frame, including a pair of plates, a wheel rotatably mounted between said plates, means carried by the frame for rotating said wheel, an arcuately-shaped guide member U-shaped in section mounted between the plates concentric with the wheel and having a base portion radially spaced from the periphery of the wheel and side portions extending to the periphery of the wheel and forming therewith a conduit having its upper end adjacent the container to receive seed therefrom and guide it to the ground, and means yieldably mounted on said guide member having its lower end directed radially inwardly to the periphery of the wheel to form therewith a pocket for the accumulation of seed, and lugs secured to the wheel and engageable with the seed in said pocket, said pocket-forming means being yieldable radially outwardly to accommodate ejection of the seed by said lugs.

9. In a planter having a mobile frame, a seed container and a boot structure mounted on the frame, including a pair of plates, a wheel rotatably mounted between said plates, means carried by the frame for rotating said wheel, an arcuately-shaped guide member U-shaped in section mounted between the plates concentric with the wheel and having a base portion radially spaced from the periphery of the wheel and side portions extending to the periphery of the wheel and forming therewith a conduit having its upper end adjacent the container to received seed therefrom and guide it to the ground, and means yieldably mounted on said guide member having its lower end directed radially inwardly to the periphery of the wheel to form therewith a pocket for the accumulation of seed, and lugs secured to the wheel and engageable with the seed in said pocket, said pocket-forming means being yieldable to accommodate ejection of the seed by said lugs, said pocket-forming means including a leaf spring having its upper end anchored to said plates and having its main body spaced from and concentric with the wheel to form a channel to guide the seed from the container to the ground and having its lower end directed toward the periphery of the wheel to form said pocket therewith.

10. The invention set forth in claim 9, wherein means is provided for operatively securing said leaf spring to said plates medially of its ends to provide a main body yieldable radially to accommodate passage of seed therebetween and the ends of said lugs and a lower pocket-forming end yieldable about the axis of said securing means upon engagement thereof by said lugs.

References Cited
UNITED STATES PATENTS

| 203,325 | 5/1878 | Davies | 222—414 |
| 803,082 | 10/1905 | Waterman | 222—414 X |
| 1,269,591 | 6/1918 | Fischer. | |
| 1,285,610 | 11/1918 | Burnett | 222—288 |
| 1,751,486 | 3/1930 | Lutz | 111—34 |
| 3,133,515 | 5/1964 | Beebe | 111—51 X |
| 3,142,275 | 7/1964 | Buhr | 111—51 |
| 3,176,636 | 4/1965 | Wilcox et al. | 111—51 |

ABRAHAM G. STONE, *Primary Examiner.*

J. R. OAKS, *Assistant Examiner.*